(12) United States Patent
Hollemans et al.

(10) Patent No.: US 8,633,914 B2
(45) Date of Patent: *Jan. 21, 2014

(54) USE OF A TWO FINGER INPUT ON TOUCH SCREENS

(71) Applicant: Adrea, LLC, Sunnyvale, CA (US)

(72) Inventors: Gerrit G. Hollemans, Helmond (NL); Huib V. Kleinhout, Hagan (NO); Henriette C. M. Hoonhout, Eindhoven (NL); Sander B. F. Van De Wijdeven, Eindhoven (NL); Vincentius P. Buil, Eindhoven (NL)

(73) Assignee: Adrea, LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,306

(22) Filed: Jun. 13, 2013

(65) Prior Publication Data
US 2013/0278527 A1 Oct. 24, 2013

Related U.S. Application Data

(63) Continuation of application No. 12/980,657, filed on Dec. 29, 2010, now Pat. No. 8,466,893, which is a continuation of application No. 11/570,601, filed as application No. PCT/IB2005/052005 on Jun. 17, 2005, now Pat. No. 7,864,161.

(60) Provisional application No. 60/580,655, filed on Jun. 17, 2004.

(51) Int. Cl.
*G06F 3/041* (2006.01)

(52) U.S. Cl.
USPC ........... 345/173; 345/619; 345/156; 345/174; 178/18.01

(58) Field of Classification Search
USPC ................ 345/173–178, 156, 619; 710/1–74; 178/18.01–19.04; 358/1.1–1.18
See application file for complete search history.

(56) References Cited

U.S. PATENT DOCUMENTS 4,914,624 A    4/1990   Dunthorn et al.
5,168,531 A *  12/1992  Sigel ............................ 382/291
(Continued)

FOREIGN PATENT DOCUMENTS

DE    101 61 924 A1    4/2003
EP    0 156 593 A2    10/1985
(Continued)

OTHER PUBLICATIONS

Office Action mailed Nov. 16, 2009, for U.S. Appl. No. 11/570,601.
(Continued)

*Primary Examiner* — Lun-Yi Lao
*Assistant Examiner* — Kelly B Hegarty
(74) *Attorney, Agent, or Firm* — Finnegan, Henderson, Farabow, Garrett & Dunner, LLP

(57) ABSTRACT

A system and method for detecting at least two-finger input on a touch screen of a display such as computer, etc. includes a display screen; a sensing grid arranged for sensing touch on said display screen; a plurality of electrodes connected electrically to the sensing grid. A controller receives an output from the sensing grid, and a module identifies at least two points on the grid indicating locations of the display screen that have been touched by a user and identifies a geographic portion of the display screen to be identified based on said at least two points. As the position of the fingers are relative to the position of the screen via change in a direction of a Z-coordinate, a variable zoom can be provided by the sensing grid commensurate with different distances that the multiple fingers are sensed from the display screen.

18 Claims, 3 Drawing Sheets

(56) References Cited

U.S. PATENT DOCUMENTS

| | | | |
|---|---|---|---|
| 5,454,043 A * | 9/1995 | Freeman | 382/168 |
| 5,483,261 A * | 1/1996 | Yasutake | 345/173 |
| 5,579,037 A | 11/1996 | Tahara et al. | |
| 5,686,940 A * | 11/1997 | Kuga | 345/156 |
| 5,887,069 A * | 3/1999 | Sakou et al. | 382/100 |
| 5,914,677 A | 6/1999 | Ahmadian | |
| 5,920,309 A * | 7/1999 | Bisset et al. | 345/173 |
| 6,072,494 A * | 6/2000 | Nguyen | 715/863 |
| 6,229,529 B1 | 5/2001 | Yano et al. | |
| 6,249,290 B1 | 6/2001 | Herndon et al. | |
| 6,323,846 B1 * | 11/2001 | Westerman et al. | 345/173 |
| 6,624,833 B1 * | 9/2003 | Kumar et al. | 715/863 |
| 6,681,031 B2 * | 1/2004 | Cohen et al. | 382/103 |
| 6,950,534 B2 * | 9/2005 | Cohen et al. | 382/103 |
| 7,030,861 B1 | 4/2006 | Westermnan et al. | |
| 7,394,346 B2 * | 7/2008 | Bodin | 340/5.51 |
| 7,460,690 B2 * | 12/2008 | Cohen et al. | 382/103 |
| 7,519,223 B2 * | 4/2009 | Dehlin et al. | 382/203 |
| 7,643,006 B2 * | 1/2010 | Hill et al. | 345/156 |
| 2002/0015024 A1 * | 2/2002 | Westerman et al. | 345/173 |
| 2002/0036618 A1 * | 3/2002 | Wakai et al. | 345/157 |
| 2002/0070923 A1 | 6/2002 | Levy et al. | |
| 2002/0140633 A1 * | 10/2002 | Rafii et al. | 345/8 |
| 2003/0020738 A1 | 1/2003 | Milburn et al. | |
| 2003/0093600 A1 * | 5/2003 | Perala et al. | 710/72 |
| 2005/0057524 A1 * | 3/2005 | Hill et al. | 345/173 |
| 2006/0010400 A1 * | 1/2006 | Dehlin et al. | 715/856 |
| 2006/0026521 A1 * | 2/2006 | Hotelling et al. | 715/702 |
| 2006/0238520 A1 * | 10/2006 | Westerman et al. | 345/173 |
| 2007/0198950 A1 * | 8/2007 | Dodge et al. | 715/815 |
| 2009/0040215 A1 * | 2/2009 | Afzulpurkar et al. | 345/419 |
| 2009/0244033 A1 * | 10/2009 | Westerman et al. | 345/174 |
| 2010/0164891 A1 * | 7/2010 | Hill et al. | 345/173 |
| 2011/0234638 A1 * | 9/2011 | Hill et al. | 345/661 |
| 2012/0176343 A1 * | 7/2012 | Holmgren et al. | 345/175 |
| 2013/0141376 A1 * | 6/2013 | Dagman et al. | 345/173 |

FOREIGN PATENT DOCUMENTS

| | | |
|---|---|---|
| EP | 0 622 722 A2 | 11/1994 |
| EP | 0 689 122 A1 | 12/1995 |
| EP | 0 773 496 A1 | 5/1997 |
| JP | 59-214941 | 12/1984 |
| JP | 2001-290585 | 10/2001 |
| JP | 2002-501271 | 1/2002 |
| JP | 2002-342033 | 11/2002 |
| JP | 2003-511799 | 3/2003 |
| JP | 2003-280812 | 10/2003 |
| JP | 2007-533044 | 11/2007 |
| WO | WO 03/032141 A2 | 4/2003 |

OTHER PUBLICATIONS

Office Action mailed May 17, 2010, for U.S. Appl. No. 11/570,601.
Advisory Action mailed Jul. 23, 2010, for U.S. Appl. No. 11/570,601.
Notice of Allowance and Fee(s) Due mailed Aug. 19, 2010, for U.S. Appl. No. 11/570,601.
First Office Action, issued Nov. 30, 2007, for Chinese Patent Application No. 200580020119.4.
Second Office Action, issued Aug. 1, 2008, for Chinese Patent Application No. 200580020119.4.
Notice of Grant of Patent Right for Invention, issued Dec. 26, 2008, for Chinese Patent Application No. 200580020119.4.
Communication under Rule 112 EPC, dated Nov. 21, 2007, for European Patent Application No. 05751681.7.
Communication pursuant to Article 94(3) EPC, dated Apr. 20, 2010, for European Patent Application No. 05751681.7.
Notification of Reasons for Rejection, mailed Apr. 5, 2011, for Japanese Patent Application No. 2007-516139.
Notification of Reasons for Rejection, mailed Sep. 13, 2011, for Japanese Patent Application No. 2007-516139.
Notice of Reasons for Preliminary Rejection, mailed Aug. 24, 2011, for Korean Patent Application No. 10-2006-7026494.
Notice of Decision Granting Patent, mailed Feb. 14, 2012, for Korean Patent Application No. 10-2006-7026494.
International Search Report and Written Opinion, mailed Feb. 16, 2006, for International Patent Application No. PCT/IB2005/052005.
Office Action mailed Aug. 2, 2012, for U.S. Appl. No. 12/980,657.
Notice of Allowance and Fee(s) Due mailed Feb. 20, 2013, for U.S. Appl. No. 12/980,657.
Japanese Office Action, mailed Oct. 1, 2013, for Japanese Patent Application No. 2012-180544.

* cited by examiner

USE OF A TWO FINGER INPUT ON TOUCH SCREENS

CROSS REFERENCE TO RELATED APPLICATIONS

This application is a continuation of application Ser. No. 12/980,657, filed Dec. 29, 2010, now U.S. Pat. No. 8,466,893 issued Jun. 18, 2013; which is continuation of U.S. application Ser. No. 11/570,601, filed Dec. 14, 2006, now U.S. Pat. No. 7,864,161 issued Jan. 4, 2011; which is a National Phase Application of and claims priority to PCT International Application No. PCT/IB2005/052005 filed Jun. 17, 2005, which claims the benefit of U.S. Provisional Application No. 60/580,655, filed Jun. 17, 2004, entitled "Use of a Two Finger Input on Touch Screens," all of which are hereby incorporated by reference in their entireties.

TECHNICAL FIELD

The present invention relates to touch screen displays used in computer terminals, kiosks, PDAs, etc. More particularly, the present invention relates to multiple finger input on touch screens.

BACKGROUND

Touch screens have had enormous growth in many areas of modern life. Touch screens are now common in places such as kiosks at airports, automatic teller machines (ATMs), vending machines, computers of all kinds. The elimination of the need for a pointing device and/or a light pen in many applications has been widely successful.

There are several different touch technologies, many of which differ in the way that touch is detected. For example, capacitive technologies that utilize the finger as a shunt for a small alternating current that is run to ground through the operator's body. With scanning infrared systems, a user's touch is registered when a finger (or a stylus) encounters an array of infrared beams. There is also a surface acoustic-wave touch screen, wherein the screen absorbs the acoustic waves propagating on the touch surface, and the touch is identified by the drop in acoustic signal from the touch location. Resistive touch technologies are based on two layers of conductive material held apart by small, barely visible spacers. When the screen is touched, the two layers come into contact, and two-dimensional coordinate information is generated by the voltages produced at the touch location.

One of the problems with typical touch mechanisms is that they cannot determine the exact position of the fingers pressed up against a screen if more than one finger is used. One reason that such detection mechanisms have a problem with multi-finger pointing is that a sensing grid is used instead of a large number of point sensors.

FIG. 1 illustrates a sensing grid. This figures shows of series of grids having a predetermined shape. Thus, if two fingers touch the screen at the same time, it cannot be determined whether the grid A', A, B', B is caused by the fingers touching A and B, or A' and B.

There is a problem in what occurs when two fingers touch different vertical lines (points A and B are on different vertical lines and different horizontal lines) so that both two vertical lines and two horizontal lines are activated (i.e. each point having both a different Y and a different Y coordinate). Thus, there is still a need in the art to identify two finger input using a sensing grid.

The presently claimed invention provides a method and apparatus for a touch mechanism to detect a two-finger input on touch screens. Although in the typical sensing grid system, it is difficult to determine the placement of the fingers on the grid, in a first aspect of the invention a square formed by the activation of the lines on the sensing grid caused by two finger touch can be used to make a selection of items that are displayed within this square in order to select, zoom, copy, move, delete, etc., or select a dial to rotate the contents of the grid. In the present invention, a combinatorial matrix touch screen is used to indicate a square with two fingers.

In another aspect of the invention, a 3D virtual touch screen, using the two-finger input of the present invention, permits a Z-coordinate that can be used to rotate the selected item(s) around the Z-axis. In addition, the Z-coordinate can be used to as a "zoom" by changing the size of the selection as a function of the distance to the screen.

DESCRIPTION OF THE EMBODIMENTS

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the current description so as not to obscure the finer points of the present invention.

Figure 1:
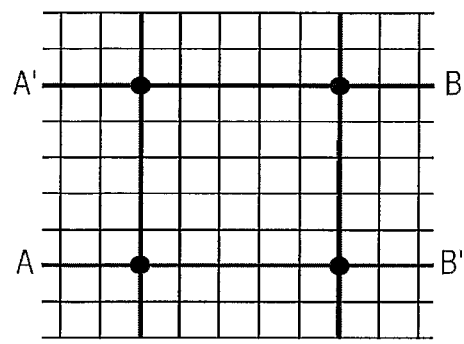
FIG. 1 is an illustration of a grid array used by a touch screen detection mechanism.

According to an aspect of the present invention, the square shown in FIG. 1 that is formed by A, B, A' and B' can be used by the system without identifying exactly which two of the four points are being touched by the user. In other words, rather than discriminate between points A and B or A' and B' (or A' and B or A and B'), the bounded rectangle A' B B'A is taken as an input which is then used for the functions such as selection, zoom, color change, highlight, delete, etc. The movement of the fingers along the screen may change the selected portion of the screen. However, for example, once an item is selected, moving the fingers across the screen can perform a drag function for which one normally uses a pointing device, such as a mouse.

In addition, the distance that the fingers are located from the screen can then be used, for example, to select an item, change the degree of zoom, change the colors within the area of the bounded box, or even to highlight the items within the bounded box.

Figure 2A:
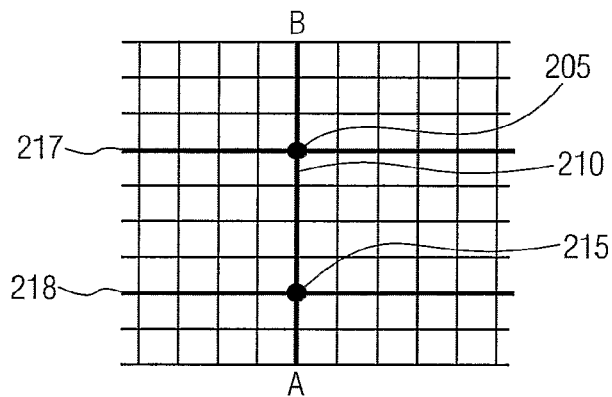
FIG. 2A illustrates a first aspect of the present invention showing a single line of a sensing grid being activated.

According to another aspect of the present invention, if the same line is touched on multiple locations, this multi-finger touch is detected by comparing which lines are touched in the horizontal direction. FIG. 2A illustrates a single line touched at two points, activating a single line of the sensing grid AB. This particular case would be less likely to occur than the first example, and has particular value, for example, if the difference between the lines activated in a certain direction is too small, e.g. given the granularity of the displayed items that could be selected.

In the particular case shown in FIG. 2A, the vertical line is assumed to be activated by two finger touch; one of the fingers touching point A 205 and another finger touching point B 215. While there is a measurable vertical distance (in the Y direction) between point A 215 and point B 205, the horizontal distance is essentially zero between the two points. If only the AB sense line 210 is active, according to the invention a square can highlighted on screen using a line orthogonal to AB and passing through its midpoint. It should be noted that the exact same concept holds true for horizontally activated sense lines where more than one finger is touching along a same horizontal line activating one horizontal line and two vertical lines, or possibly other angles such as diagonal, as these terms are relative to the position of the user viewing the touch screen.

Figure 2B:
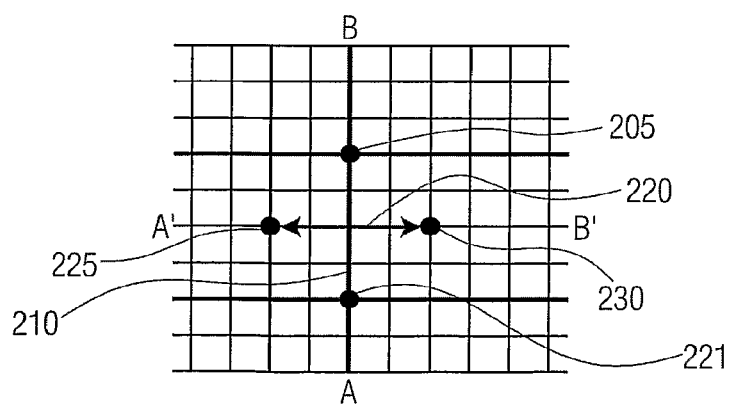
FIG. 2B illustrates a second aspect of the present invention utilizing a center of the squares to form a more accurate area sensed by touch.

In other words, if one measures the distance between AB 210, half of that distance is the center, or midpoint of the line. Another line, the exact length of the distance of AB 210, but perpendicular to the line AB 210, is activated through the midpoint, to form a horizontal line A'B' 230, as shown in FIG. 2*b*. Thus, assuming, for example that one of the finger is touching the point 205 and the other finger is touching point 221, a single square/rectangle on the sensing grid can be illuminated on the display screen that is comprised of the two finger input.

Therefore, unlike the first aspect of the invention, wherein the bounded box results from two points, both having different X and Y coordinates, in this example, a size of the rectangle shown on the display is calculated by the sensing of a length of at least one sensed line, and at a midpoint of the at least one sensed line calculating a second line 221 that is perpendicular to the at least one sensed line and having a same length as said at least one sensed line 210. Accordingly, based on a length defined by a location of said at least two points 205, 220 of the display screen touched by at least two fingers, and a width defined by two end points 225, 230 of the second line 220, coordinates are provided to show a rectangle being identified on the display screen.

Figure 3:
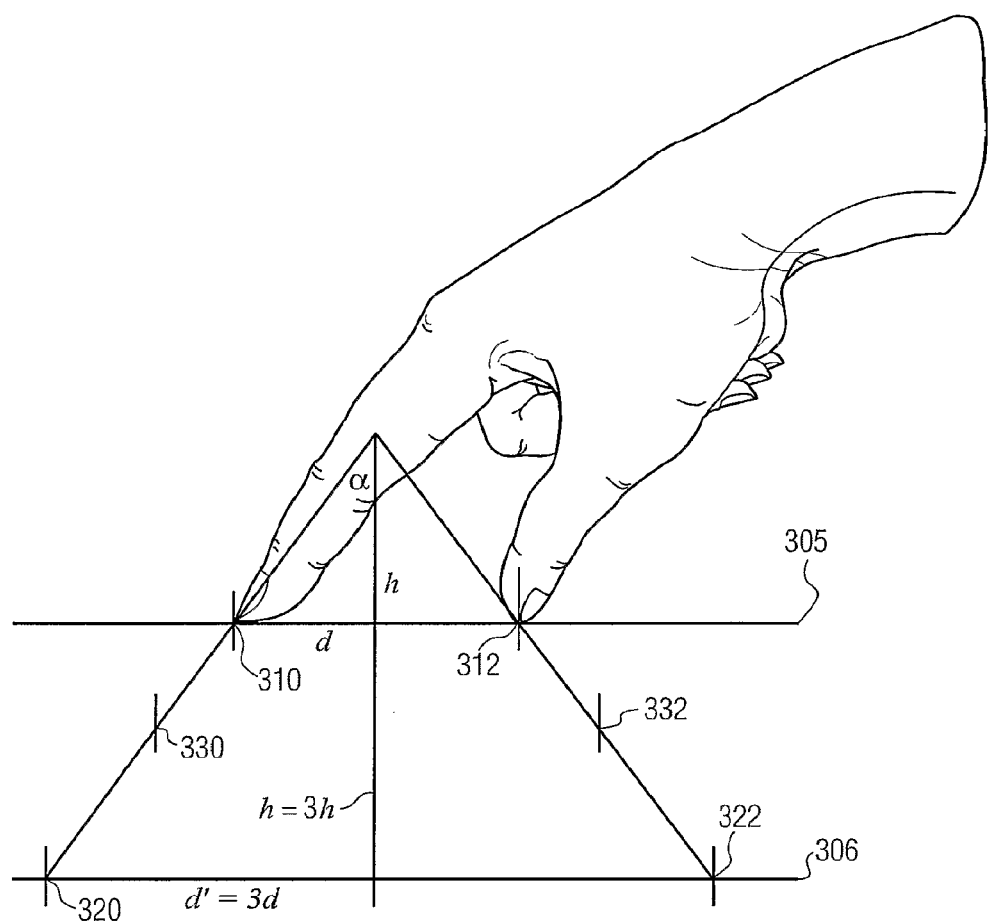
FIG. 3 illustrates a third aspect of the present invention that can be used with three dimensional viewing systems.

FIG. 3 illustrates yet another aspect of the invention, wherein a screen comprises a 3D virtual touch screen. Typically, in this aspect of the invention, the screen would preferably comprise a capacitance sensing screen. However, it is within the spirit and scope of the invention that there can be an application in other types of touch screens.

The screen 305 is touched by a user with two fingers at respective points 310, 312. Thus the capacitance sensing field senses multiple "blips", as two fingers are acting as shunts for a small alternating current that is run to ground (through the user's body). In addition to horizontal and vertical coordinates shown in FIGS. 1 and 2 (i.e. X and Y) a "Z" coordinate, which is a height from the surface of the touch screen can also be implemented with the two-finger input previous described.

The distance of each of the fingers from the surface of the touch screen can affect the amount of current that is shunted through the user. There can be a determination made on the distance of the fingers based on the drop of, for example, current relative to a table of values. Of course, if the finger exceeds a distance from the screen that permits the user to act as a shunt, then that particular finger would no longer be sensed as "touching the screen". In fact, the term "touch" is relative in this instance, as the fingers can cause actuation of the screen display without necessarily pressing on the screen.

The Z-coordinate can be used, for example to rotate the selected items on the screen around the Z-axis. Additionally, according to the present invention, the Z-coordinate can also be used as a zoom, particularly when the size of the intended selection on the screen is larger than the span of the fingers on the hand. This zoom would be particularly useful in large computer monitors, televisions, bathroom mirrors, etc. The distance of the fingers from the screen can be scaled to provide a variable zoom.

The Z coordinate can then be used to zoom the size of the selection as a function of the distance to the screen. If the angle $\alpha$ (shown in FIG. 3) is kept constant over all distances, the size of the surface of the selection grows with the square of the change in distance from screen. If the user changes the angle $\alpha$ by moving his fingers closer together or further apart, this would cause what constitutes the selected area, meaning that either more or less than what is between points 310 and 312 shown in FIG. 3 would be selected due to the change in the angle $\alpha$.

For example, FIG. 3 first shows a user's fingers in approximate contact with the screen 305. If the user pulled his/her fingers back so as to have them a distance 2h from the screen, then the visible are between the fingers at points 310 and 312 would now be enlarged so as to be displayed between the points 320 and 322. If the fingers are moved somewhat closer to the screen than a distance 2h, but still further away from the screen than points 310, 312, the area of the screen between points 310 and 312 would be enlarged to cover the space between points 330 and 332. Thus, the user can vary the zoom as needed by moving his/her fingers closer or further from the screen.

It should be noted that "h" shown in FIG. 3 is taken roughly equal to the distance of the hand to the screen or the length of finger to make the proportional change intuitive. The function of taking the zoom factor of the surface as the square of the distance from the screen can be varied according to need. With regard to zooming, the relationship between the distance "d" (shown in FIG. 3) and the height "h" when there is a change in position can be defined by:

$$d = \frac{(h + \Delta h)}{\Delta h} * d \text{ (wherein } \Delta h > 0\text{).}$$

For example, if h doubles, then $\Delta h$ is equal to h and d would be:

$$\frac{(1+1)}{1} * d = 2d.$$

The above relationship holds true so long as the angle $\alpha$ (alpha, shown in FIG. 3) is constant and $\Delta h > 0$. However, it is possible that for a given alpha that a user cannot span the entire screen and the angle $\alpha$ must be altered. In such a case, the relationship between d and h can be defined by:

$$d = e * ((h + \Delta h)/\Delta h) * d,$$

wherein epsilon (e) is an extra multiplier. For example if epsilon is equal to 2, then a doubling of the distance causes a quadrupling of d (height and width of the area).

It should also be noted that when varying the zoom according to the distance of the fingers from the touch screen, for example, based on an amount of sensed current shunted along a sensing grid, the accuracy of determining the distance of the fingers from the screen is not constant for all distances from the screen. For example, the further away the fingers are from the screen, the less accurate the distance detection tends to become, until eventually it cannot even detect a shunting effect caused by the fingers. To reiterate, the present invention is applicable even if the distance from the screen in which the fingers can be detected changes from what is currently detectable. In addition, although FIG. 3 gives one the impression that the zoom factor is strictly linear, it is understood that in actuality it may not be linear at all. Slight differences in distance closer to the screen may result in a varying in the amount of zoom that is not the same as compared to slight difference in distance of the fingers when relatively further away from the screen.

It is also possible that there can also be individual differences in the shunting due to the size of the fingers, for example, a child's finger may not shunt current when approximating contact with the screen in the exact amount as an adult man with large fingers. However, the individual shunting could result in people with different sized fingers having to position their fingers at a somewhat different distance h to obtain the same degree of zoom as other users. The principle, of course, does not change in that the zoom is varied according to the distance of the finger from the screen.

With regard to the variable zoom based on two finger input, the presently claimed invention could also be adapted for use with resistive screens that vary the amount of resistance based on finger pressure. In such a case, touching the screen at two points with a certain degree of pressure could be used to initially select an area for viewing, and then pressing harder into the screen with both fingers (or lighter, for that matter) can be used to variable zoom in and out of the selected area.

Figure 4:
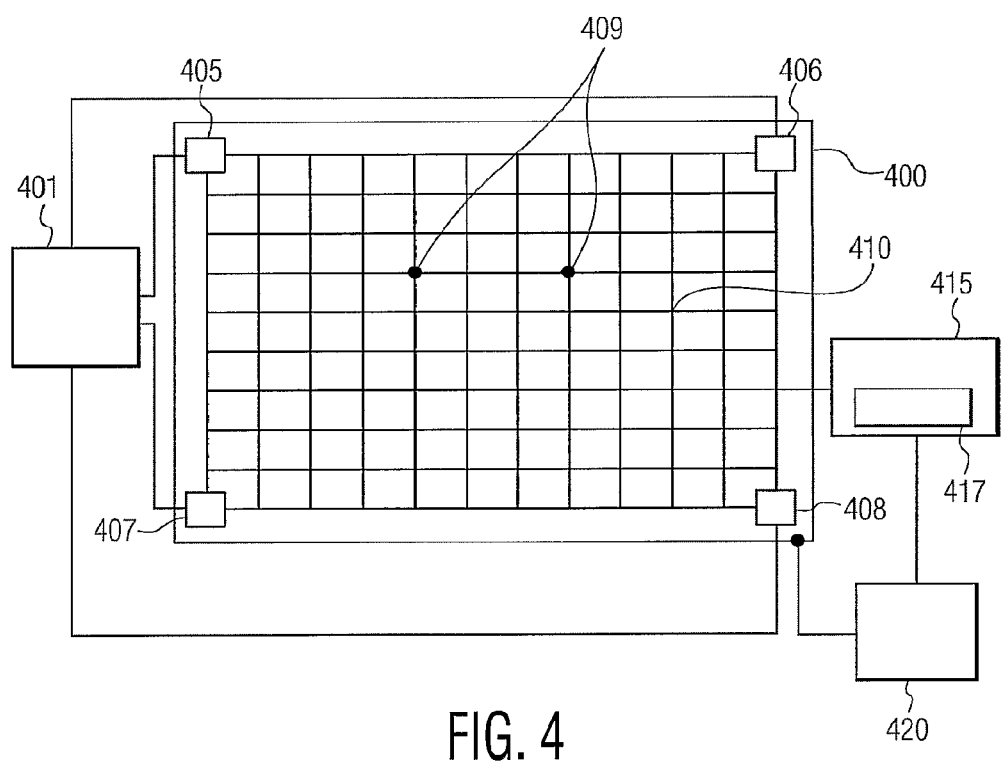
FIG. 4 illustrates an example of hardware that can be used according to the present invention.

FIG. 4 illustrates an example of hardware that can be used according to the present invention. This particular example illustrates a capacitive technology, but it should be noted that it is within the spirit and scope of the presently claimed invention that it can be adapted to other types of touch screens.

A voltage source 401 will provide a predetermined voltage to contacts 405,406,407,408. It is possible that the voltage could be deliver to only some of the contacts and then alternate to other contacts after a predetermined amount of time, or delivered to all the contacts. Typically the screen would have an overlay that is coated with a transparent metal oxide. When the voltage is applied to the contacts, there can be a small current running through the grid 408. When two fingers either touch the screen (represented by the dots 409) or come within a predetermined distance so as to create a voltage drop at the points X1, Y1, X2, Y2, which are represented in the drawing by the dots 409. The finger acts like a shunt to drain some current/voltage from the grid. The exact location of the points are calculated by the controller 415 and transmitted to the display logic 420 that provides the screen output.

The controller 415 has a module 417 that is used to detect an area of the screen, typically a rectangle, whose initial area is determined by the points on the screen contacted. The module 417 contains hardware and/or software to construct a rectangle by finding a midpoint of sense lines activated by the touch at points 409 and provide a perpendicular sense line of the same length through the midpoint In addition, the module 417 also is adapted to permit 3D-capability, wherein the selected area can be rotated around the Z coordinate, or the proximity of the fingers from the screen at a common angle there between to provide a variable zoom. As the fingers are backed away from the points 409, the zoom becomes larger and the close to the actual points 409 are the two fingers, the zoom can be decreased. It is also possible to reverse the zoom so the zoom becomes smaller as you move your fingers away from the screen and larger as you move closer to the screen.

It should also be understood by persons of ordinary skill in the art that the distance of the fingers from the screen can also be used for functions other than a zoom function. For example, such as distance can be used for increasing/decreasing a selection size of the area that can be controlled.

Various modifications can be made to the present invention by a person of ordinary skill in the art that do not depart from the spirit of the invention or the scope of the appended claims. For example, the touch screen may use resistive, capacitive, SAW, Infrared or NFI (near field imaging). While Applicants disclose that a rectangle is highlighted by two finger touch, it is possible to express other shapes that would still be within the spirit of the invention and the scope of the appended claims. When the rectangle is highlighted, a series of options may appear on the screen, such as move, delete, rotate, that can be activated by touching that particular area of the grid where the words (such as deletion, rotation of 90 degrees, 45 degrees, move, change color, change shape, etc.), can be highlighted. It should be noted that rotation and translation are best done by rotating or moving a hand, rather than just the fingers. In addition, other items, such as changing color and changing shape can be performed by touch.

The screen can be coated with any known film used for touch display, and can be used on any type of display, including minors, windows, televisions, windshields of vehicles (wherein a map could be displayed on a small area thereof, and the fingers could zoom in and out) computers, PDAs, wireless communication devices, standard wireless telephones, video cell phones, etc. Furthermore, while the geographic portion identified by the touch is exemplified in the illustrations as a rectangle or square, it could be a circle, oval, triangle, diamond shape (two opposed triangles) polygonal, parallel-piqued, etc.

The invention claimed is:

1. A system for detecting two-finger input on a touch screen, the system comprising:
    a display screen;
    a sensing grid arranged for sensing a position of a user relative to the display screen;
    a plurality of electrodes arranged at corners of the sensing grid, the plurality of electrodes being electrically connected to the sensing grid;
    a controller configured to receive an output from the sensing grid; and
    a control module configured to identify at least two points on the sensing grid indicating locations on the display screen selected by the user and to identify a geographic portion of the display screen based on the at least two points, the at least two points being related to relative positions of two fingers of the user with respect to a surface of the display screen,
    wherein the identified geographic portion of the display screen is configured to rotate based on a change in a relative height of the two fingers from the surface of the display screen.

2. The system of claim 1, wherein the at least two points have different X and Y coordinates on the sensing grid and the identified geographic portion comprises a rectangle.

3. The system of claim 2, wherein the rectangle comprises two active lines in the sensing grid in a horizontal direction and two active lines in a vertical direction.

4. The system of claim 1, wherein the sensing grid comprises a plurality of vertical and horizontal sense lines, wherein if only one vertical or horizontal sense lines is active on the sensing grid, a size of the identified geographic portion is calculated by the control module by sensing a length of the active sense line and, at a midpoint of the active sense line, calculating a second line that is perpendicular to the active sense line and having a same length of the active sense line, and based on the length of the active sense line and the length of the second line, calculating coordinates of a rectangle encapsulating the active sense line and the second line of the display screen to determine the size of the identified geographic portion.

5. The system of claim 1, wherein the identified geographic portion comprises a rectangle and the control module is configured to provide coordinates of the rectangle to display logic configured to control an image shown on the display screen.

6. The system of claim 1, wherein the sensing grid is configured for capacitive sensing.

7. The system of claim 1, wherein the sensing grid is configured for resistive sensing.

8. The system of claim 1, wherein the sensing grid is configured for acoustic wave sensing.

9. The system of claim 1, wherein the sensing grid is configured for optical sensing.

10. The system of claim 1, wherein the sensing grid is configured for near field imaging (NFI).

11. The system of claim 1, wherein the identified geographic portion of the display screen is configured to rotate around an axis substantially perpendicular to the display screen based on the change in a relative height of the two fingers from the surface of the display screen.

12. The system of claim 1, wherein an indicator of the identified geographic portion of the display screen is configured to be removed from the display screen based on a change in the relative positions of the two fingers of the user with respect to the surface of the display screen.

13. The system of claim 1, wherein the identified geographic portion of the display screen is configured to be highlighted based on a change in the relative positions of the two fingers of the user with respect to the surface of the display screen.

14. The system of claim 1, wherein the identified geographic portion of the display screen is configured to be moved based on a change in the relative positions of the two fingers of the user with respect to the surface of the display screen.

15. The system of claim 1, wherein the identified geographic portion of the display screen is configured to change shape based on a change in the relative positions of the two fingers of the user with respect to the surface of the display screen.

16. The system of claim 1, wherein the identified geographic portion of the display screen is configured to change an amount of illumination of the portion based on a change in the relative positions of the two fingers of the user with respect to the surface of the display screen.

17. The system of claim 1, wherein the change in relative distances of the two fingers from the surface of the display screen is determined based on an amount of current drop sensed by the sensing grid.

18. The system of claim 1, wherein a view of the identified geographic portion of the display screen is variably magnified as the relative distances of the two fingers from the surface of the display screen increases to a predetermined maximum distance.

* * * * *